US012596207B2

(12) United States Patent (10) Patent No.: US 12,596,207 B2
Janzer (45) Date of Patent: Apr. 7, 2026

(54) ARRANGEMENT FOR REFLECTION SUPPRESSION IN A WINDSCREEN DISPLAY SYSTEM, AND WINDSCREEN DISPLAY SYSTEM

(71) Applicant: Bayerische Motoren Werke Aktiengesellschaft, Munich (DE)

(72) Inventor: Michael Arthur Janzer, Unterschleissheim (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 464 days.

(21) Appl. No.: 17/925,066

(22) PCT Filed: May 5, 2021

(86) PCT No.: PCT/EP2021/061914
§ 371 (c)(1),
(2) Date: Nov. 14, 2022

(87) PCT Pub. No.: WO2022/008119
PCT Pub. Date: Jan. 13, 2022

(65) Prior Publication Data
US 2023/0182570 A1 Jun. 15, 2023

(30) Foreign Application Priority Data

Jul. 10, 2020 (DE) ...................... 10 2020 118 315.1

(51) Int. Cl.
*G02B 1/115* (2015.01)
*B60K 35/22* (2024.01)
(Continued)

(52) U.S. Cl.
CPC .............. *G02B 1/115* (2013.01); *B60K 35/22* (2024.01); *B60K 35/231* (2024.01); *B60K 35/28* (2024.01);
(Continued)

(58) Field of Classification Search
CPC .... B60K 35/00–90; B60K 2360/00–96; G02B 27/01–0189; G02B 2027/0105–0198; G02B 1/00–18
See application file for complete search history.

(56) References Cited

U.S. PATENT DOCUMENTS 4,832,427 A * 5/1989 Nanba ................ G02B 27/0103
359/24
6,486,856 B1 11/2002 Zink
(Continued)

FOREIGN PATENT DOCUMENTS

DE 198 16 647 A1 10/1999
DE 103 46 884 A1 5/2004
(Continued)

OTHER PUBLICATIONS

International Search Report (PCT/ISA/210) issued in PCT Application No. PCT/EP2021/061914 dated Aug. 11, 2021 with English translation (six (6) pages).
(Continued)

*Primary Examiner* — Christopher A Lamb, II
(74) *Attorney, Agent, or Firm* — Crowell & Moring LLP

(57) ABSTRACT

A windscreen display system for a motor vehicle has a head-up display device. The head-up display device has a projection device for emitting a projection light beam with a first item of image information towards a display region of a windscreen so that the information is reflected there and can be perceived in an eye region, and a transparent covering for protecting the projection device, the covering having a cover pane and an antireflection layer applied to one or both sides.

6 Claims, 2 Drawing Sheets

(51) Int. Cl.

| | |
|---|---|
| *B60K 35/231* | (2024.01) |
| *B60K 35/28* | (2024.01) |
| *B60K 35/40* | (2024.01) |
| *B60K 35/60* | (2024.01) |
| *G02B 1/118* | (2015.01) |
| *G02B 27/01* | (2006.01) |

(52) U.S. Cl.

CPC ............ *B60K 35/425* (2024.01); *B60K 35/60* (2024.01); *G02B 1/118* (2013.01); *G02B 27/0101* (2013.01); *B60K 2360/23* (2024.01); *B60K 2360/25* (2024.01); *B60K 2360/334* (2024.01); *B60K 2360/693* (2024.01); *B60K 2360/785* (2024.01); *G02B 2027/012* (2013.01)

(56) References Cited

U.S. PATENT DOCUMENTS

| | | | | |
|---|---|---|---|---|
| 2004/0113866 A1* | 6/2004 | Aoki | ...................... | B60K 35/60 |
| | | | | 345/7 |
| 2011/0100424 A1* | 5/2011 | Roche | ................... | G02B 1/115 |
| | | | | 136/246 |

| | | | | |
|---|---|---|---|---|
| 2016/0202482 A1* | 7/2016 | Kuzuhara | ............ | H04N 5/7491 |
| | | | | 359/633 |
| 2018/0356634 A1* | 12/2018 | Riebe | ..................... | B60K 35/00 |
| 2019/0258059 A1* | 8/2019 | Takahashi | ............. | B60K 35/60 |
| 2021/0072539 A1* | 3/2021 | Ogisu | ................ | G02B 27/0103 |
| 2022/0206197 A1* | 6/2022 | Tamura | ................... | G02B 5/26 |

FOREIGN PATENT DOCUMENTS

| | | | |
|---|---|---|---|
| DE | 10 2010 032 998 A1 | 2/2012 |
| DE | 10 2015 221 970 A1 | 5/2017 |
| DE | 10 2017 211 507 A1 | 1/2019 |
| DE | 10 2017 215 378 B4 | 6/2019 |
| EP | 2 894 509 A1 | 7/2015 |
| JP | 6-27971 A | 10/1994 |

OTHER PUBLICATIONS

German-language Written Opinion (PCT/ISA/237) issued in PCT Application No. PCT/EP2021/061914 dated Aug. 11, 2021 (six (6) pages).

German-language Search Report issued in German Application No. 10 2020 118 315.1 dated Mar. 10, 2021 with partial English translation (10 pages).

* cited by examiner

ARRANGEMENT FOR REFLECTION SUPPRESSION IN A WINDSCREEN DISPLAY SYSTEM, AND WINDSCREEN DISPLAY SYSTEM

BACKGROUND AND SUMMARY OF THE INVENTION

The invention relates to windscreen display systems, in particular having head-up display devices, for motor vehicles. In particular, the present invention relates to measures for suppressing interfering reflections due to ambient light incident on a projection device of the head-up display device.

Windscreen display devices, such as head-up display devices, for visually displaying items of information in the field of view of a driver of a motor vehicle are known from the prior art. For example, document DE 10 2010 032 998 A1 describes a head-up display for a motor vehicle having a projection device, via which an image to be displayed is projected onto a windscreen of a motor vehicle acting as a combiner device. Such windscreen display devices have the advantage in contrast to the other display devices in the motor vehicle that the driver does not have to turn his sight away from the traffic events to acquire important items of information, for example, the instantaneous vehicle velocity or optical instructions of a navigation system.

In known head-up display devices, measures are provided to avoid ambient light, which is incident in a projection device of the head-up display device, being reflected onto the windscreen of the motor vehicle, being reflected from there in the direction of the driver and thus blinding the driver and/or impairing the presentation of the information to be displayed. The projection device is therefore generally provided with a reflective and curved cover pane, which reflects incident ambient light in the direction of a light absorbing surface, also called a mirror bank. The reflected ambient light is only reflected to a minor extent on the light absorbing surface, so that interfering reflections of ambient light or illumination in a display area on the windscreen can be essentially avoided.

However, this so-called geometric antireflection treatment only represents a part of the reflections which are reflected via the cover pane. In general, the geometric antireflection treatment can only suppress a part of the interfering light incident from the surroundings. Furthermore, interfering ambient light can be guided into the ocular area of the driver by double reflection on the cover pane, so that the driver is thus blinded. This relates in particular to interfering light which is incident through the windscreen on the cover pane, is reflected from there onto the windscreen, and is reflected on the windscreen back onto the cover pane. It is directed here directly or again via the windscreen into the ocular area of the driver.

A motor vehicle having a display device which has at least one multiple display is known from document DE 10 2017 215 378 B4, wherein the display device is arranged in the field of view of a driver of the motor vehicle in such a way that a first perspective range corresponds to that of a driver on the display device and a second perspective range is directed onto a mirror section, which is formed to be reflective in the direction of the driver and is adjacent to a windscreen base of the windscreen.

Such a display device, which is called a windscreen base display device herein, is generally arranged under a mirror area at a lower edge of a windscreen of a motor vehicle. A windscreen base display device has a self-lighting display area, via which an item of image information can be output. This image information is reflected on the mirror area of the windscreen and is perceptible via this by the driver.

In a combination of a conventional head-up display device with a windscreen base display device, this can have the result that the mirror bank at least partially blocks the view of the mirror area of the windscreen base display device. Due to the restricted installation space in the dashboard, however, a projection device of the windscreen display device cannot be lowered arbitrarily, so that either the cover pane of the windscreen display device or the mirror bank is located in the beam path for perceiving the windscreen base display device.

It is an object of the present invention to provide an improved arrangement for reflection suppression in a windscreen display system, which also suppresses multiple reflections of ambient light which cannot be absorbed by the mirror bank. It is furthermore an object of the present invention to impair the reflection suppression in a display system having a head-up display device and a windscreen base display device.

This object is achieved by the claimed arrangement for reflection suppression in a windscreen display system and by the claimed windscreen display system.

According to one aspect, an arrangement is provided for a windscreen display system for a motor vehicle having a head-up display device, wherein the head-up display device has a projection device for emitting a projection light beam having an item of image information in the direction of a display area of a windscreen, so that it is reflected there and is perceptible in an ocular area, and has a transparent cover for protecting the projection device, wherein the cover has a cover pane and an anti-reflective layer applied on one side or both sides.

This enables improved suppression of reflections of the ambient light, in particular due to double reflections on the cover pane. Double reflections on the cover pane can occur, on the one hand, when, if a mirror bank is present for geometric antireflection treatment, ambient light from the cover pane is incident on an area of the windscreen outside the mirror bank and is reflected from there again onto the cover pane, or if the mirror bank is arranged in the interior of the windscreen to use the inner surface of the windscreen if necessary for a windscreen base display or the like.

The reflection of ambient light on the cover pane inside has, without antireflective layer, approximately the same strength as the reflection from the cover pane outside (approximately 4% each, thus a total of 8% reflectivity). The brightness of the reflection can therefore be reduced by at most 49.9% by an antireflective layer only arranged on the outside. However, if the antireflective layer is applied to the inside and outside of the cover pane, the reflection can thus be reduced by 99.8%. For this reason, the cover pane is preferably also provided on the inside with an antireflective layer to ensure the best possible reflection suppression.

Furthermore, the cover can be arranged and formed, in particular curved, in such a way, wherein a component of the ambient light is reflected on a mirror bank.

In particular, the antireflective layer can be applied to an upper side of the cover pane.

Alternatively, the antireflective layer can be applied to a lower side of the cover pane to reduce a reflection of ambient light incident in the projection device in the direction of the windscreen.

According to one embodiment, a windscreen base display device can be provided to output a second item of image information via a display device, so that it is reflected in the windscreen base area so that the reflected second item of image information is perceptible in the ocular area, wherein the display device outputs the second item of image information using light of the first polarization direction, where an inside of the windscreen base area facing toward the windscreen base display device is made reflective and wherein an absorption structure is arranged in the interior of the windscreen base area.

Furthermore, the antireflective layer can comprise a multiple layer system made up of materials having low index of refraction and high index of refraction and/or moth eye structures.

According to a further aspect, an arrangement is provided having the above windscreen display system in a dashboard of a motor vehicle and the windscreen.

Embodiments are explained in more detail hereinafter on the basis of the appended drawings.

DETAILED DESCRIPTION OF THE DRAWINGS

Figure 1:
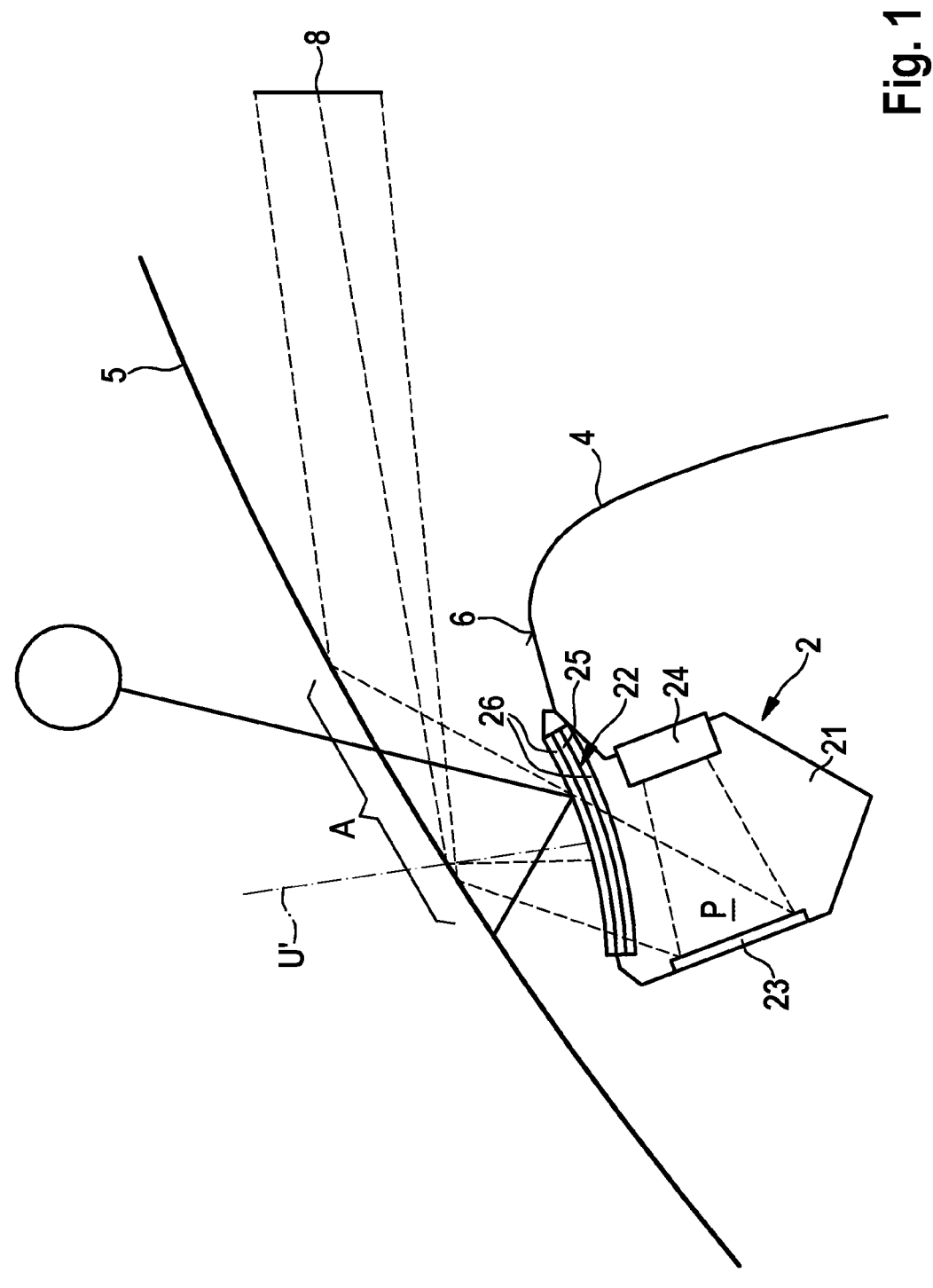
FIG. 1 shows a schematic cross-sectional view through a windscreen display system for a motor vehicle.

FIG. 1 schematically shows a cross-sectional view through a windscreen display system having a head-up display device 2. The head-up display device 2 comprises a projection device 21 for emitting a projection light beam P having a first item of image information and a cover 22. The projection beam P is directed onto a display area A of a windscreen 5 of a motor vehicle, so that it is reflected there into an ocular area 8 (eye box) of the driver.

The cover 22 is used to protect the projection device 21 from external influences, in particular from soiling. The cover 22 of the projection device 21 has a cover pane 25 and is preferably curved to bundle incident ambient light and reflect it in a targeted manner.

The head-up display device 2 is essentially inserted into an opening of an upper side 6 of a dashboard 4 between a steering wheel and a windscreen 5 of a motor vehicle so that it terminates essentially flush with the upper side 6 or adjoins it.

The projection device 21 comprises in a known manner an optical system made up of one or more mirrors 23, possibly lenses (not shown), and a projector 24. The first item of image information output by the projector 24 is oriented as the projection light beam P by the one or the multiple mirrors 23 in the projection direction and projected on the display area A. The projection light beam P reflected in the display area A into the eye of the driver is used to present a corresponding item of information to the driver.

To implement a geometric antireflective treatment, a mirror bank (glare trap) is arranged on an end of the cover pane 25 facing toward the windscreen 5. The cover pane 25 is in particular concavely curved, so that a majority of the incident ambient light U is reflected on a surface of the cover pane 25. The ambient light thus reflected is directed by the curvature of the cover pane 25 onto the mirror bank. The side of the mirror bank facing toward the cover pane 25 is made light absorbing, in particular matte black, so that the ambient light incident there is only reflected again to a minor extent. A reliable suppression of interfering reflections of ambient light is thus achieved.

Instead of the unified mirror bank, a louvered grill can also be arranged above the cover pane 25, which has light absorbing louvers to ensure the geometric antireflective treatment.

While the provision of the mirror bank or, in an alternative embodiment, the louvered grill represents a geometric antireflective treatment, in which incident ambient light is prevented by absorption from being reflected into the ocular area 8, additional measures are necessary to prevent ambient light reflected multiple times from being reflected into the ocular area 8. One possible beam path of ambient light incident in this way is shown by the ambient light beam U' shown by way of example in FIG. 1.

It is therefore additionally provided that the cover pane 25 is provided with an antireflective layer 26 on one or both sides. An antireflective layer on an upper side of the cover pane 25 has the effect that ambient light incident on the cover pane 25, which would not be reflected onto the mirror bank but back onto the inside of the windscreen 5, is absorbed, damped, or attenuated. Ambient light reflected in this way can thus only reach the ocular area 8 of the driver to a very minor extent or not at all due to multiple reflections between cover pane 25 and windscreen 5.

Providing an antireflective layer on an inside of the cover pane 25, i.e., the side facing toward the projection device, enables improved suppression of reflections of the ambient light.

The reflection of ambient light on the cover pane inside has, without antireflective layer, approximately the same strength as the reflection on the cover pane outside (approximately 4% each, thus a total of 8% reflectivity). Therefore, the brightness of the reflection can be reduced by at most 49.9% by an antireflective layer only arranged on the outside. However, if the antireflective layer is applied to the inside and the outside of the cover pane 25, the reflection can thus be reduced by 99.8%.

In this way, in addition to the geometric antireflective treatment, an antireflective treatment of the cover pane, preferably on both sides, represents an additional measure for avoiding interfering multiple reflections of ambient light into the ocular area of the driver.

Possible antireflective layers can comprise multiple layer systems made of materials having low index of refraction and high index of refraction and/or moth eye structures. Moth eye structures convert the density jump from air to cover pane material into a flat gradient and thus reduce the reflection.

Both variants can be broadband (flat spectrum at least in the range 430-630 nm) and can cover a broad angle of incidence (with 20% change of the reflection (in relation to 0° angle of incidence)) in the angle of incidence range of +/−35°.

Figure 2:
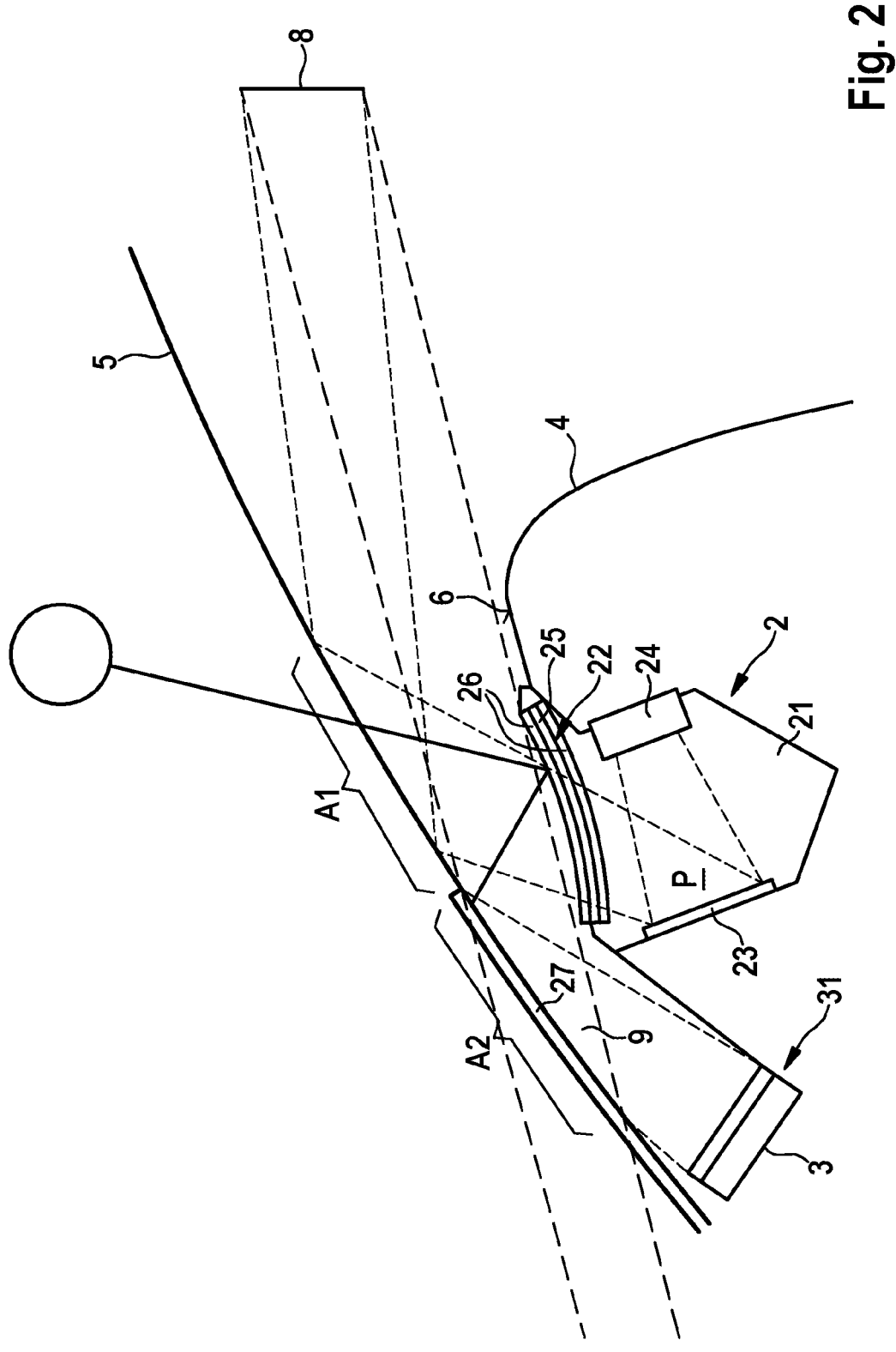
FIG. 2 shows a schematic cross-sectional view through a further display system for a motor vehicle.

FIG. 2 schematically shows a cross-sectional view through a windscreen display system having a head-up display device 2 and a windscreen base display device 3. The reference signs which relate to identical elements were retained.

The head-up display device 2 comprises the projection device 21 and the cover 22, wherein the projection beam P is directed onto a first display area A1 of a windscreen 5 of a motor vehicle, so that it is reflected there into the ocular area 8 (eye box) of the driver.

Below the first display area A1 is a second display area A2. The second display area A2, also called the windscreen base area here, is arranged between the lower edge of the windscreen 5 and the first display area A1. The second display area A2 can, for example, directly adjoin the lower edge of the windscreen 5. The display areas A1 and A2 can adjoin one another or have a distance from one another.

In particular, the second display area A2 can be formed having an absorption area, in particular in the form of a black print area, to suppress a transmission of light and to reflect a second item of image information displayed on a windscreen base display device 3 so that the reflected image can be perceived by the driver, on whom the projection light beam of the head-up display device 2 is also directed.

The windscreen base display device 3 can comprise a single self-illuminating display device 31, in particular in the form of an LCD display having backlight or an OLED display device, which is arranged and oriented with respect to the second display area A2 so that the second item of image information displayed there can be perceived by the driver in the ocular area 8.

The driver can therefore perceive both the second item of image information of the windscreen base display device 3 and also the first item of image information of the head-up display device 2 simultaneously via the second or first display area A2, A1, respectively. The display areas A1, A2 are preferably arranged in the vertical direction one over the other. However, these can also alternatively or additionally be arranged laterally offset in relation to one another.

The cover pane 25 of the cover 22 of the projection device 21 can be curved and arranged so that incident ambient light is reflected in the second display area, i.e., the windscreen base area. The windscreen base area is therefore to be used as a mirror bank for ambient light incident on the cover. Since the second display area A2 is strongly light reflective without further measures, in particular if it is formed having an absorption structure or a black print area, this could have the result that the driver is blinded by renewed reflection of the ambient light reflected on the cover.

In the illustrated arrangement, the second display area and the mirror bank area mutually overlap. However, since the second display area has to be made reflective to implement the windscreen base display, it cannot be used directly as a mirror bank. Therefore, an absorption structure 27, in particular a black print area, can be provided in the interior of the windscreen 5 in the area of the second display area A2, so that the second display area can be used both as a mirror bank and also as a reflection area for the windscreen base display.

Depending on the angle of incidence of directly incident ambient light or ambient light reflected on the cover pane at the second display area, multiple reflections of ambient light can occur due to the reflective surface, which can reach the ocular area of the driver.

It is therefore additionally provided that the cover pane 25 is provided on one or both sides with an antireflective layer 26. An antireflective layer 26 on an upper side of the cover pane 25 has the effect that ambient light incident on the cover pane 25, which is reflected due to its curvature into the second display area, is absorbed, damped, or attenuated. Multiple reflections via the second display area are also suppressed in an improved manner.

LIST OF REFERENCE SIGNS 1 windscreen display system
2 head-up display device
21 projection device
22 cover
23 mirror
24 projector
25 cover pane
26 antireflective layer
27 absorption structure
3 windscreen base display device
31 display device
4 dashboard
5 windscreen
6 upper side of the dashboard
8 ocular area
6 upper side of the dashboard
9 second polarization filter
10 protruding structures
A1 first display area
A2 second display area
P projection beam

The invention claimed is:

1. A windscreen display system for a motor vehicle, the windscreen display system comprising:
a head-up display device comprising:
a projection device for emitting a projection light beam having a first item of image information in a direction of a display area of a windscreen, so that the projected light beam is reflected at the display area and is perceptible in an ocular area, and
a transparent cover for protecting the projection device, wherein the transparent cover has a cover pane and an antireflective layer applied to one side or both sides of the cover pane, and
a windscreen base display device configured to output a second item of image information via a display device, so that the second item of image information is reflected in a windscreen base area and the reflected second item of image information is perceptible in the ocular area, wherein:
the windscreen base area is a portion of the windscreen,
the display device outputs the second item of image information using light of a first polarization direction,
an inside of the windscreen base area facing toward the windscreen base display device is reflective,
an absorption structure is arranged in an interior of the windscreen base area, and
the transparent cover is curved such that a component of ambient light is reflected onto a mirror bank.

2. The windscreen display system according to claim 1, wherein the antireflective layer is applied to an upper side of the cover pane.

3. The windscreen display system according to claim 1, wherein the antireflective layer is applied to a lower side of the cover pane.

4. The windscreen display system according to claim 1, wherein the antireflective layer comprises multiple layer systems made up of materials having low index of refraction and high index of refraction and/or moth eye structures.

5. An arrangement comprising the windscreen display system according to claim 1, wherein the windscreen display system is arranged in a dashboard of the motor vehicle and the windscreen.

6. The windscreen display system according to claim 1, wherein the antireflective layer is applied to both sides of the cover pane.

* * * * *